US011472334B1

(12) United States Patent
Pukharev

(10) Patent No.: US 11,472,334 B1
(45) Date of Patent: Oct. 18, 2022

(54) AUTOMOBILE SIDEVIEW MIRROR BRACKET FOR MOUNTING AUXILIARY LIGHTS

(71) Applicant: Nikolay Pukharev, Milwaukie, OR (US)

(72) Inventor: Nikolay Pukharev, Milwaukie, OR (US)

( * ) Notice: Subject to any disclaimer, the term of this patent is extended or adjusted under 35 U.S.C. 154(b) by 0 days.

(21) Appl. No.: 17/719,907

(22) Filed: Apr. 13, 2022

Related U.S. Application Data

(60) Provisional application No. 63/175,029, filed on Apr. 14, 2021.

(51) Int. Cl.
| *B60Q 1/26* | (2006.01) |
| *F21V 29/83* | (2015.01) |
| *F21V 3/00* | (2015.01) |
| *B60R 1/12* | (2006.01) |

(52) U.S. Cl.
CPC .......... *B60Q 1/2665* (2013.01); *B60R 1/1207* (2013.01); *F21V 3/00* (2013.01); *F21V 29/83* (2015.01)

(58) Field of Classification Search
CPC ....... B60Q 1/2665; B60R 1/1207; F21V 3/00; F21V 29/83
See application file for complete search history.

(56) References Cited

U.S. PATENT DOCUMENTS

| 5,296,973 | A | 3/1994 | Burke |
| 6,769,798 | B2 | 8/2004 | Mishimagi |
| 6,811,269 | B2 | 11/2004 | Strode et al. |
| 9,134,002 | B2 | 9/2015 | Okada et al. |
| 2007/0115675 | A1* | 5/2007 | Tsai .......................... B60Q 1/22 362/487 |
| 2012/0154911 | A1 | 6/2012 | Huynh et al. |

FOREIGN PATENT DOCUMENTS

KR 20070119183 A * 12/2007

* cited by examiner

*Primary Examiner* — Anne M Hines
*Assistant Examiner* — Jose M Diaz
(74) *Attorney, Agent, or Firm* — Binita J. Singh; Bold IP, PLLC

(57) ABSTRACT

The present invention is directed toward a device that allows auxiliary lights to be mounted to a side view mirror of a motor vehicle. The device includes a shell which is custom manufactured to conform to a shape of a cover of a sideview mirror on a particular make, model, and year of a motor vehicle. The shell is configured to house one or more auxiliary light elements which can be chosen by a motor vehicle owner. The device also includes one or more air passage sections configured on the shell formed to direct air into an interior of the shell to cool the auxiliary light elements. The device also includes one or more through openings configured on the forward-facing side of the shell to which one or more light covers may be positioned over and arranged in front of the auxiliary light elements.

20 Claims, 2 Drawing Sheets

AUTOMOBILE SIDEVIEW MIRROR BRACKET FOR MOUNTING AUXILIARY LIGHTS

CROSS-REFERENCE TO RELATED APPLICATIONS

This application is a non-provisional application which claims priority to U.S. Provisional Patent Application No. 63/175,029 filed on Apr. 14, 2021, which is incorporated by reference in its entirety.

FIELD OF DISCLOSURE

The overall field of this invention generally pertains to a vehicle lighting system, in particular to auxiliary lighting systems that may be installed on to a vehicle post manufacturing.

BACKGROUND

A vehicle's external lighting units are an important part of a vehicle. The external lighting units improve visibility at night for the driver of a vehicle. The lighting units also improve the visibility of a vehicle's presence, position, size, and direction of travel for other drivers and pedestrians. These lighting units serve their purposes both at night and also during the day. In general, the lighting system of a vehicle consists of lighting and signaling devices integrated to the front, rear, sides, and in some cases the top of a motor vehicle. The basic and necessary lighting systems are integrated into the motor vehicle during manufacturing.

Some owners of motor vehicles also seek to improve the visibility for nighttime driving, inclement weather, and off-road driving with auxiliary lights. Auxiliary driving lights are designed to provide relatively long-range illumination forward of the vehicle that enhance the visibility of distant objects. Auxiliary driving lights are generally designed to be mounted above the vehicle's bumper or in its grill, or in the case of off-road driving, auxiliary driving lights are even mounted on the vehicle's roof. Most auxiliary lights will require hardware to be mounted to a part of the vehicle or may require the purchase of a light-mounting bar (which may be attached to an existing front fender). In both cases, the mounting will require drilling into a part of a vehicle (e.g., bumper or front fender).

Accordingly, there is still a need for an auxiliary lighting system that is easy to install and does not require hardware or a need to drill into a part of a vehicle.

SUMMARY

According to one embodiment, one or more embodiments are provided below for a device that is designed to be mounted to a sideview mirror of a motor vehicle after manufacturing of the motor vehicle. The one or more embodiments describe an auxiliary lighting bracket wherein the bracket may be custom designed to fit sideview mirrors of any make and model of motor vehicles. The present disclosure describes that the auxiliary lighting bracket is designed to slip onto and wrap around or mold around the sideview mirrors of a motor vehicle for which it is custom designed. The bracket may be designed to house an auxiliary light source, which may include and not be limited to LED lights for aesthetic purposes, high beam lights for night driving, or off road/day running lights.

The key feature of the bracket is that it attaches to the side view mirror without any bolts or other attachment means that require drilling into the vehicle. The bracket would ideally be manufactured from ABS plastic or other compatible material that may be amenable to being installed onto a side view mirror without using tools or drilling into a body of the motor vehicle. The bracket may also comprise of a cooling means to prevent heat accumulating from the auxiliary light source housed in an interior of the bracket. Additionally, the bracket may also comprise of a means to connect wiring from the auxiliary light source in the interior of the bracket. Alternate embodiments of the bracket include a bracket that may be mounted to a side view mirror of a motor vehicle provided with an interior that may house two separate auxiliary lighting sources.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
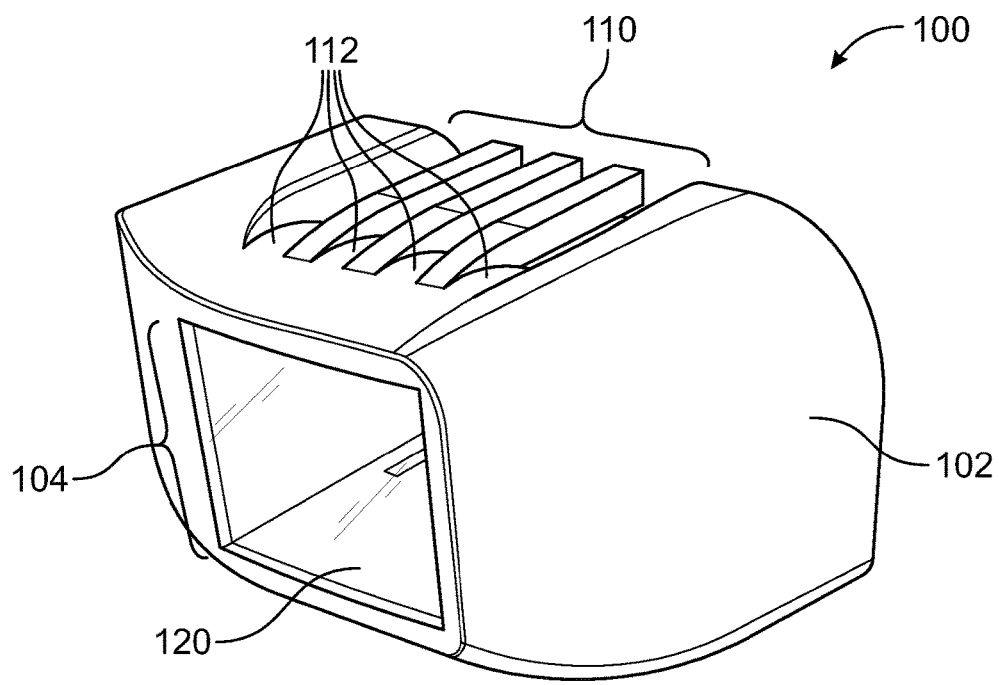
FIG. 1 is a perspective view of a non-limiting embodiment of an auxiliary lighting bracket which may be mounted to a sideview mirror of a motor vehicle.

In the Summary above and in this Detailed Description, and the claims below, and in the accompanying drawings, reference may be made to particular features of the invention. It may be understood that the disclosure of the invention in this specification includes all possible combinations of such particular features. For example, where a particular feature may be disclosed in the context of a particular aspect or embodiment of the invention, or a particular claim, that feature can also be used, to the extent possible, in combination with and/or in the context of other particular aspects and embodiments of the invention, and in the invention generally.

Where reference may be made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" may be used herein to mean "serving as an example, instance, or illustration." Any aspect described in this document as "exemplary" may not be necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any items, so a "set of items" may indicate the presence of only one item or may indicate more items. Thus, the term "set" may be equivalent to "one or more" as used herein.

The present disclosure recognizes the unsolved need for an improved and easy system to mount auxiliary lights to a motor vehicle which obviates the need to drill into a body of the vehicle. Thus, it is an object of the present invention to provide an improved, economical, and easy system to mount auxiliary lights to a motor vehicle. It is also an object of the present invention to provide a system to mount auxiliary lights to a motor vehicle's sideview mirror without drilling into the vehicle's body. It is also an object of the present invention to provide a system of mounting auxiliary lights to a motor vehicle that is removable.

This present disclosure describes a device that is designed to be mounted to a sideview mirror of a motor vehicle and describes a bracket which may be custom designed to fit sideview mirrors of any make and model of motor vehicles. The present disclosure describes an auxiliary lighting bracket which may comprise a bracket which is designed to slip onto and wrap around or mold around the sideview mirrors of motor vehicles. The bracket may be designed to house an auxiliary light source, which may include and not be limited to LED lights for aesthetic purposes, high beam lights for night driving, and off road/day running lights.

The key feature of the bracket is that it attaches to the side view mirror without any bolts or other attachment means that require drilling into the vehicle. The bracket would ideally be manufactured from ABS plastic or other compatible material that may be amenable to being installed onto a side view mirror without using tools or drilling into a body of the motor vehicle. The bracket may also be configured with air channels to prevent heat accumulation from the auxiliary light source housed in an interior of the bracket. Additionally, the bracket may also be configured to connect an auxiliary light source in the interior of the bracket to the vehicle's electrical source and be wired to be controlled from within the vehicle. Alternate embodiments of the bracket that may be mounted to a side view mirror of a vehicle may be configured with an interior that may house two separate auxiliary sources.

The following description of the non-limiting embodiments generally relate to an auxiliary light bracket that may be installed on a sideview mirror of a motor vehicle. The auxiliary light bracket may be custom designed to be installed on any make and model of a motor vehicle while adhering to the principal of the invention which is that the bracket may be installed on a side view mirror without the use of tools and without having to drill into any part of a motor vehicle. Referring particularly to the Figures in the accompanying drawings, there is illustrated an example of a bracket that may be installed on a side view mirror of a motor vehicle. The figures and description herein are presented to aid in the understanding of the present invention and not in any way to limit the invention.

Figure 3:
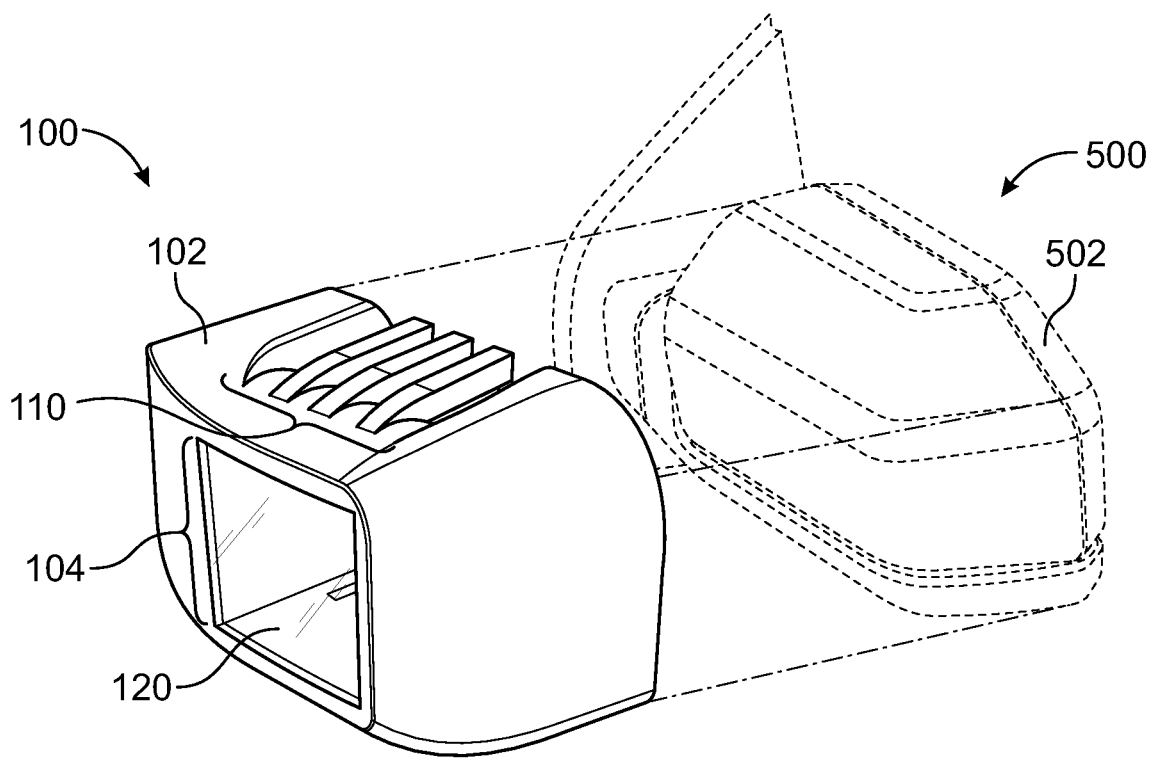
FIG. 3 is a perspective view illustrating a position on a side view mirror for the mounting of the auxiliary lighting bracket according to one or more embodiments.
Figure 4:
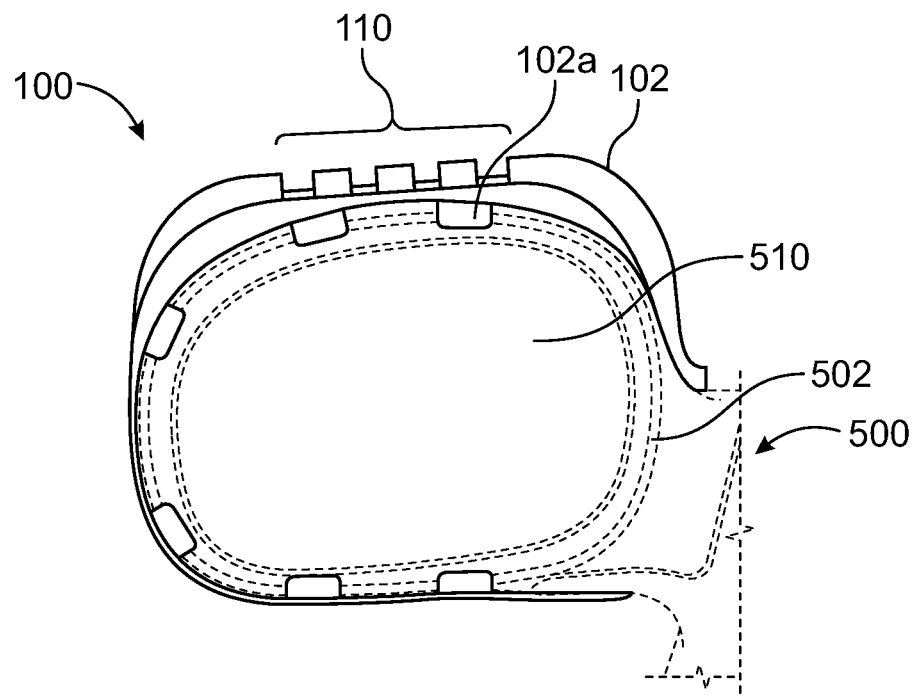
FIG. 4 is a front view of the side view mirror and the positioning of the auxiliary lighting bracket in accordance with one or more embodiments.

FIG. 1 illustrates an example of an auxiliary light bracket 100 that is designed to house an auxiliary light source and configured to be mounted to a sideview mirror (see FIG. 3, sideview mirror 500) of a motor vehicle. Throughout this disclosure, the term auxiliary light bracket 100 may be interchangeably referred to as a bracket. Referring to FIGS. 3 and 4, an example of a sideview mirror 500 is illustrated. A sideview mirror 500 can be a door mirror attached to a vehicle door. Usually, a sideview mirror 500 has a cover 502 and a mirror 510. The cover 502 of the sideview mirror 500 can be in a curved shape wherein it acquires a convex shape having a portion that extends outward and a portion that has an opening. The portion of the cover that has the opening can house the mirror 510 and may be considered as a mirror housing. The mirror 510 faces in a rearward facing direction defined on the basis of the corresponding direction of a vehicle body. The cover 502 of the sideview mirror that extends outward faces a forward-facing direction defined on the basis of the corresponding direction of a vehicle body. The auxiliary light bracket 100 may be mounted onto the cover 502 on the forward-facing side of the sideview mirror such that the auxiliary lights housed within the bracket 100 face forward, as seen in FIG. 3.

Referring back to FIGS. 1 and 3, the auxiliary light bracket 100 is designed to be mounted on the cover 502 on the forward-facing side of a sideview mirror. As shown in FIG. 1, the auxiliary light bracket 100 is comprised of a shell 102, one or more air passage sections 110, a through opening 104, and a light cover 120. The characteristic construction of the auxiliary light bracket 100 is that the shell 102 is fashioned to fit over and naturally secure itself to a sideview mirror (See FIG. 3, sideview mirror 500) without additional tools or fastening means. The sleeve 102 may conform to a corresponding shape of a cover on a forward-facing side of a sideview mirror and an interior of the shell 102 (interior of shell not shown) would be provided as a conduit to house one or more auxiliary lighting elements (not shown) which would be placed in a forward-facing direction when the auxiliary light bracket 100 is fit over a sideview mirror 500 (see FIG. 3). The auxiliary lighting elements are not a part of the auxiliary light bracket 100 as a user may choose the type of auxiliary lights and purpose, which may be placed within the auxiliary light bracket 100 when installed on the side view mirror 500. The sleeve 102 is fit over a forward-facing side of a sideview mirror 500 such that the sleeve 102 does not interfere with a mirror housed in a sideview mirror and thus allows the mirror to be adjusted left, right, up, and down without moving the shell 102. The sleeve 102 would be custom manufactured to fit a particular design of a sideview mirror based on the make, model, and year of the motor vehicle.

The shell 102 may be fashioned from resilient, wear-resistant material such as plastic. The shell 102 is configured to fit over an entire cover 502 on the forward-facing side of the sideview mirror 500. The shell 102 is configured to conform to a shape of a particular motor vehicle sideview mirror cover, and thus may have a corresponding curved shape configured to fit over the entire cover on the forward-facing side of the sideview mirror. As discussed above, the shell 102 would be custom designed to fit a sideview mirror cover that corresponds with a particular motor vehicle make, model, and year. For example, an interested party may request the auxiliary light bracket 100 be manufactured to fit over their motor vehicle's sideview mirror cover, upon which the corresponding shape and dimensions of the sideview mirror cover would be taken to manufacture the shell 102 to conform to the shape and dimensions of the sideview mirror cover.

The shell 102 may have a curved lip 102a, as shown in FIG. 4, that would fit over a peripheral edge of an opening in a rearward facing side of the sideview mirror 500 wherein a mirror 510 is housed. The curved lip 102a on the shell 102 may be connected along an entirety of a peripheral edge of the interior portion of the sideview mirror cover 502. It is also contemplated that the curved lip 102a on the shell 102 may only be integrated along certain portions of the peripheral edge of the interior portion rather than the entirety of the peripheral edge, as shown in FIG. 4. The curved lip 102a on the shell 102 secures the auxiliary light bracket to a corresponding side view mirror. It is also to be understood that other non-drilling or screwless attachment means are contemplated to be within the disclosure of this invention.

FIG. 1 also illustrates the auxiliary light bracket 100 comprising of the air passage section 110. It is to be understood that the auxiliary light bracket 100 may comprise of one or more air passage sections 110. It is also to be understood that the one or more air passage sections 110 may be integrated anywhere on the shell 102 of the auxiliary light bracket as long as the placement is such that the air is directed toward the interior portion of the shell wherein the auxiliary lights are housed and provide a means to cool the auxiliary lights and the interior of the shell 102 where the heat from the auxiliary lights may accumulate. As shown in FIG. 1, the air passage section 110 is placed on a top portion of the shell 102. However, FIG. 2 illustrates another embodiment of an auxiliary light bracket 200 wherein more than one air passage sections 210 are integrated on a shell 202 and are provided on opposing sides of the shell 202 when looking at the forward-facing side of the shell 202.

Figure 2:
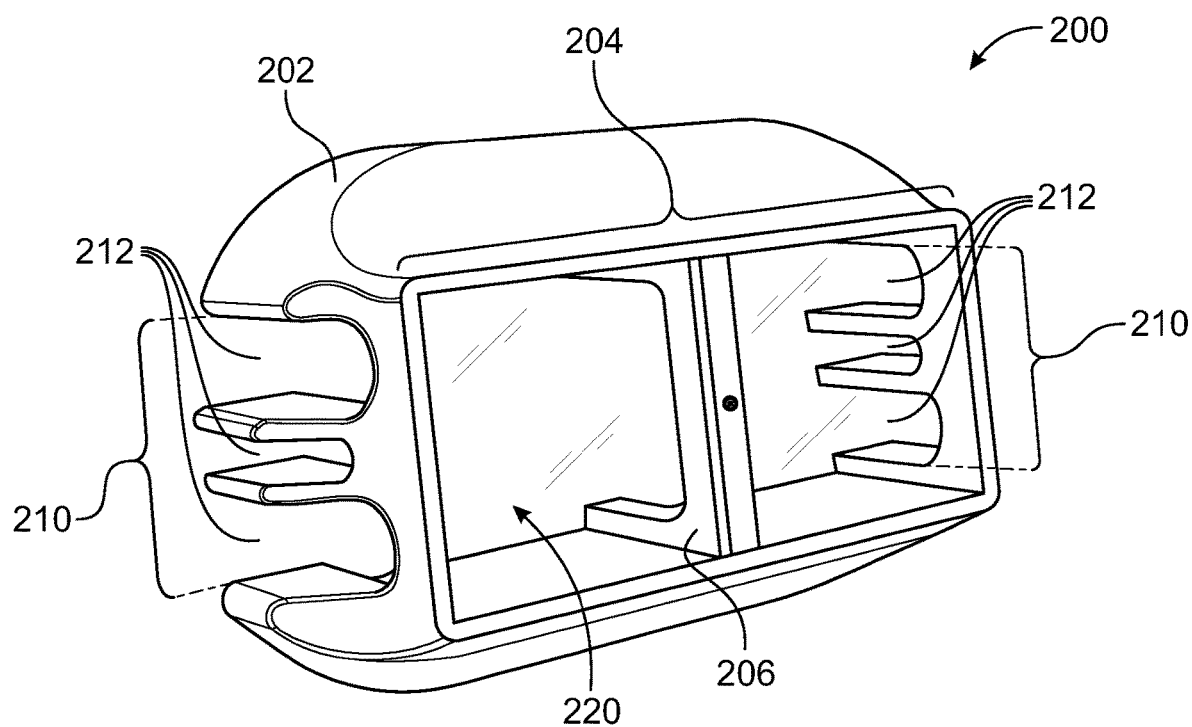
FIG. 2 is a perspective view of an alternate non-limiting embodiment of an auxiliary lighting bracket which may be mounted to a sideview mirror of a motor vehicle.

FIG. 1 and FIG. 2 illustrate the one or more air passage sections 110, 210 respectively, being designed as having one or more air channels 112, 212 which look similar to lined grooves wherein the open channels direct air into the interior section of the shell 102, 202. It is also to be understood that other styles and configurations of air directing means may also be considered and provided as part of this disclosure. In alternate embodiments, other means to cool the auxiliary light elements housed within the auxiliary light bracket 100, 200 may augment or replace the air passage sections 110, 210. Such an augmenting or replacing means may include the auxiliary light bracket 100, 200 being comprised of a heat sink fan which may be mounted to the interior portion of the auxiliary light bracket 100, 200 to transfer the heat generated by the auxiliary lights to regulate the temperature.

Referring back to FIG. 1, one or more through openings 104 and the one or more light covers 120 also comprise part of the auxiliary light bracket 100. The one or more light covers 120 are provided as a cover for the one or more auxiliary light elements which may be housed within the bracket. The light cover 120 is provided on the forward-facing side of the shell 102 which may have the one or more through openings 104 to the interior portion of the shell 102. The one or more through openings 104 may have a shape selected from the group consisting essentially of a rectangle, a square, a circle, a triangle, an oval, a trapezoid, and a polygon. The one or more light covers 120 are configured to conform to a shape of the one or more through openings 104, and thus the one or more light covers 120 have a shape selected from the group consisting essentially of a rectangle, a square, a circle, a triangle, an oval, a trapezoid, and a polygon. As shown in FIG. 1, the auxiliary light bracket comprises of one through opening 104 which is provided with one light cover 120 which would cover an auxiliary light element chosen by the motor vehicle owner.

The auxiliary light elements housed within the shell 102 may generally be mounted substantially at the through opening 104 to emit light in the forward-facing direction through the through opening 104. The light cover 120 may be capable of being removed to access the auxiliary lights housed within the auxiliary light bracket 100. The light cover 120 may be made of any material suitable for making light covers that go over a bulb and lens assemble in a motor vehicle, such as and not limited to plastic polycarbonate. On most cars, these are made from polycarbonate. Polycarbonate is a very hard and optically clear material with excellent refraction properties.

FIG. 2 illustrates an alternative embodiment of the auxiliary light bracket 200 which may be custom designed for a side view mirror associated with a particular motor vehicle make, model, and year. The auxiliary light bracket 200 of this non-limiting embodiment is configured to house more than one auxiliary light element (the light element is not part of the invention and not shown in the figures). The auxiliary light bracket 200 also comprises of a shell 202, two air passage sections 210, a through opening 204, and a light cover 220. In this embodiment, an interior portion (not shown) of the shell 202 is configured such that it may house at least two auxiliary light elements (not shown). The interior section may have a wall 206 or more than one wall that separates the interior section into two or more sections to house the auxiliary light elements which may include two or more light elements.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention, according to one or more embodiments described in the present description, may be practiced with modification and alteration within the spirit and scope of the appended claims. Thus, the description is to be regarded as illustrative instead of restrictive of the present invention.

What is claimed is:

1. A device to mount auxiliary lights to a motor vehicle, comprising:
   a shell, configured to be mounted to a sideview mirror of the motor vehicle, wherein the shell is configured to house one or more auxiliary light elements;
   one or more air passage sections configured on the shell;
   one or more through openings configured on the forward-facing side of the shell; and
   one or more light covers configured to be positioned over the one or more through openings of the shell and arranged in front of the one or more auxiliary light elements.

2. The device of claim 1, wherein the shell is configured to be mounted to a cover of the sideview mirror of the motor vehicle by slipping over the cover of the sideview mirror and affixing to the cover without using tools or drilling into the cover.

3. The device of claim 2, wherein the shell has a curved shape and is configured to fit over the entire cover on the forward-facing side of the sideview mirror by attaching to a peripheral edge of the cover.

4. The device of claim 3, wherein the shell has a curved lip that is configured to fit along an entire peripheral edge of the sideview mirror cover.

5. The device of claim 3, wherein the shell has a curved lip that is configured to fit along portions of the peripheral edge of the sideview mirror cover.

6. The device of claim 2, wherein the shell is custom designed and configured to conform to a shape and dimension of the cover of the sideview mirror corresponding with a make, model, and year of the motor vehicle.

7. The device of claim 1, wherein the one or more air passage sections are configured as having one or more air channels formed to direct air into an interior of the shell.

8. The device of claim 1, wherein the one or more through openings are configured on the shell, wherein the one or more auxiliary light elements may be positioned at the one or more through openings to direct light in a forward-facing direction.

9. The device of claim 1, wherein the one or more through openings have a shape selected from the group consisting essentially of a triangle, a quadrilateral, a polygon, a circle, or an oval.

10. The device of claim 1, wherein the one or more light covers are fashioned from a hard and optically clear material having refraction properties, and
wherein the one or more light covers are configured to conform to a shape of the one or more through openings, wherein the one or more light covers have a shape selected from the group consisting essentially of a triangle, a quadrilateral, a polygon, a circle, or an oval.

11. A device to mount auxiliary lights to a motor vehicle, comprising:
a shell configured to be mounted to a cover of a sideview mirror of the motor vehicle by slipping over the cover of the sideview mirror without using tools or drilling into the cover, wherein the shell is configured to house one or more auxiliary light elements;
one or more air passage sections configured on the shell;
one or more through openings configured on the forward-facing side of the shell; and
one or more light covers conforming to a shape and configured to be positioned over the one or more through opening of the shell and arranged in front of the one or more auxiliary light elements.

12. The device of claim 11, wherein the shell has a curved shape and is configured to fit over the entire cover on the forward-facing side of the sideview mirror by attaching to a peripheral edge of the cover.

13. The device of claim 12, wherein the shell has a curved lip that is configured to fit along an entire peripheral edge of the sideview mirror cover.

14. The device of claim 12, wherein the shell has a curved lip that is configured to fit along portions of the peripheral edge of the sideview mirror cover.

15. The device of claim 11, wherein the shell is custom designed and configured to conform to a shape and dimension of the cover of the sideview mirror corresponding with a make, model, and year of the motor vehicle.

16. The device of claim 11, wherein the one or more air passage sections are configured as having one or more air channels formed to direct air into an interior of the shell.

17. The device of claim 11, wherein the one or more through openings are configured on the shell, wherein the one or more auxiliary light elements may be positioned at the one or more through openings to direct light in a forward-facing direction.

18. The device of claim 11, wherein the one or more through openings have a shape selected from the group consisting essentially of a triangle, a quadrilateral, a polygon, a circle, or an oval.

19. The device of claim 11, wherein the one or more light covers are fashioned from a hard and optically clear material having refraction properties, and
wherein the one or more light covers are configured to conform to a shape of the one or more through openings, wherein the one or more light covers have a shape selected from the group consisting essentially of a triangle, a quadrilateral, a polygon, a circle, or an oval.

20. A device to mount auxiliary lights to a motor vehicle, comprising:
a shell, configured to be mounted to a cover of a sideview mirror of the motor vehicle, wherein the shell is configured to house one or more auxiliary light elements which are positioned to direct light in a forward-facing direction;
one or more air passage sections configured on the shell, wherein the one or more air passages sections are configured with one or more air channels that direct air toward an interior of the shell;
one or more through openings configured on the forward-facing side of the shell; and
one or more light covers fashioned from a hard and optically clear material having refraction properties configured to be positioned over the one or more through opening of the shell and arranged in front of the one or more auxiliary light elements, and wherein the one or more light covers are configured to conform to a shape of the one or more through openings.

* * * * *